E. B. GALLAHER.

MEANS FOR DELIVERING CHANGE.

APPLICATION FILED DEC. 21, 1908.

12,913.

Reissued Jan. 26, 1909.

WITNESSES:
M. F. Keating
E. C. Iruler

INVENTOR:
Edward B. Gallaher
By Charles J. Kintner
Atty

UNITED STATES PATENT OFFICE.

EDWARD B. GALLAHER, OF NEW YORK, N. Y., ASSIGNOR TO CLOVER MANUFACTURING COMPANY, OF NEW YORK, N. Y., A CORPORATION OF NEW YORK.

MEANS FOR DELIVERING CHANGE.

No. 12,913. Specification of Reissued Letters Patent. Reissued Jan. 26, 1909.

Original No. 904,475, dated November 17, 1908, Serial No. 439,576. Application for reissue filed December 21, 1908. Serial No. 468,699.

*To all whom it may concern:*

Be it known that I, EDWARD B. GALLAHER, a citizen of the United States, residing in the city of New York, borough of Manhattan, county and State of New York, have made a new and useful Invention in Means for Delivering Change, of which the following is a specification.

My invention is directed especially to devices designed for use in connection with the making of change in public places, such, for instance, as railway stations, post offices, cashiers' booths in department stores and the like, and it has for its objects, first, to provide means whereby change may be delivered to a person to whom it is assigned in such manner as to enable him to quickly receive and appropriate it so as to thereby prevent unnecessary delay. Second, to provide means of the character indicated whereby two or more persons may simultaneously quickly receive and appropriate their change without delaying others following them.

It frequently occurs at railway stations, post offices and other public places that much delay is caused by reason of the fact that persons must necessarily pick up small coins one at a time from the flat surface of the change slab in the window before the cashier or agent. With such an arrangement one may very speedily make change and slide the same forward through the window for the person for whom it is intended, but the appropriation of such change is necessarily very slow, and particularly when delivered to persons wearing gloves. It also frequently happens that during a rush the cashier or ticket agent in sliding the change forward forces it over the outer edge of the slab so that it falls to the floor, thereby causing further delay. My improvement is designed to overcome all of these objectionable features and to enable the cashier or ticket agent not only to quickly make and deliver the change before the persons for whom it is intended, but also to enable them to expeditiously receive and appropriate it and then pass on. In actual practice it has been ascertained that by the use of my improvement during the busy hours in railway stations four times as many persons may receive and appropriate their change as is possible in the old way above referred to.

Figure 1:
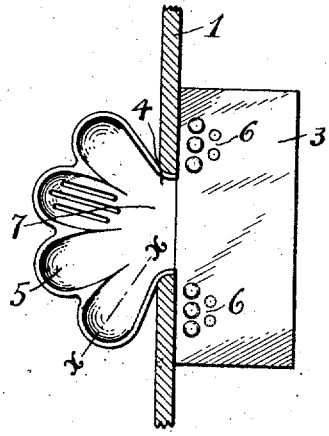
Figure 2:
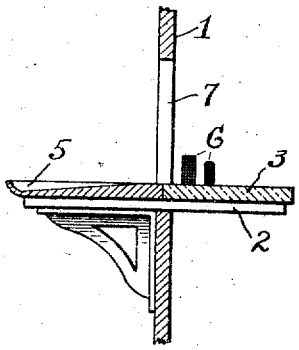
Figure 4:
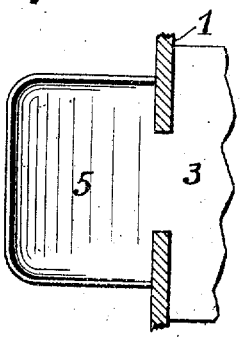
Figure 3:
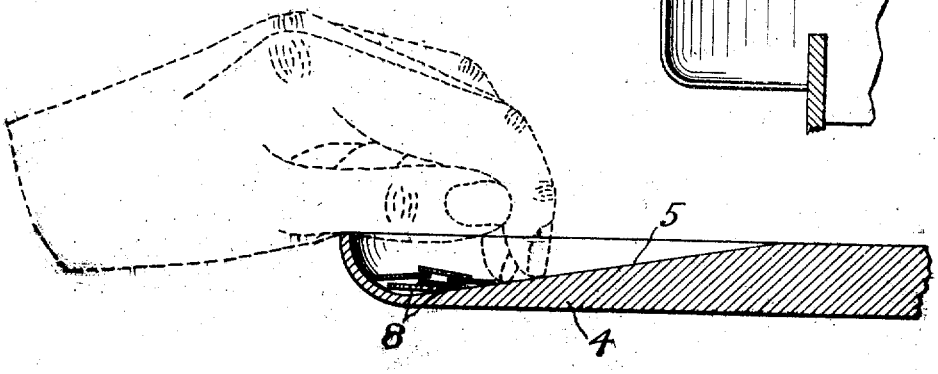
Figure 1:
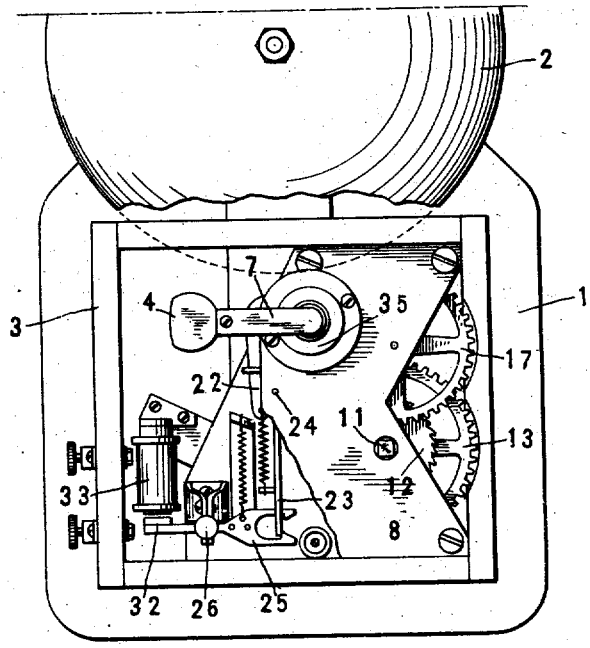
Figure 2:
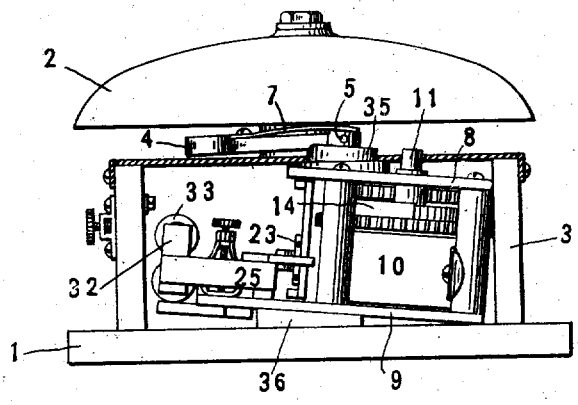

My invention will be fully understood by referring to the accompanying drawings, in which, Figure 1 is a plan view of the booth or window of a cashier or ticket agent with my improvement attached thereto, the front wall of said booth being shown in transverse sectional view, stacks of coin being shown in plan view on the change table inside the window. Fig. 2 is a vertical sectional view taken through Fig. 1, the stacks of coin being shown in elevational view. Fig. 3 is a full sized sectional view taken on the line $x$—$x$ Fig. 1 of my improved means for facilitating the delivery of coin, illustrating also in dotted lines the hand of a person and the manner of using the device. Fig. 4 is a view similar to Fig. 1 illustrating a novel modified form in the nature of an inclined shelf with turned up outer edges.

Referring now to the drawings in detail and first to Figs. 1, 2 and 3, 1 represents the front wall of the booth of a cashier or ticket agent and 7 the window thereof, 2 being the change making and delivery table therein. 3 is the usual plate glass slab upon which stacks of coins 6, 6, are located in close proximity to the cashier or agent for delivery.

The structural parts so far described are well known and in general public use, and it is customary in the making of change for the cashier or ticket agent to distribute the coins upon the coin slab inside of his office or booth of such denominations in close proximity to each other as will facilitate the making of change for other coins or bills of larger denominations, so that he may quickly slide the same forward over the glass slab to the person or persons for whom said change is intended. This separation of such coins into individual amounts for facilitating the delivery thereof is usually effected during the interim between any rush and any slack in the tide of the passage of persons purchasing articles or tickets.

My improvement embraces the combining with the plate glass slab 3 a change deliverer of the conformation shown in plan view in Fig. 1, where the part 4 fits accurately within the base of the window 7 and against the outer edge of the slab 3, the thickness of the part 4 being the same as that of the slab.

This change deliverer is constructed preferably in one piece of metal, wood, or any

H. E. REEVE.

MECHANISM FOR GONGS AND THE LIKE.

APPLICATION FILED DEC. 16, 1908.

12,914. Reissued Feb. 2, 1909.

3 SHEETS—SHEET 1.

Witnesses
J. Clyde Ripley.
C. Bradford.

Inventor
Henry E. Reeve.
By his Attorney
[signature]

THE NORRIS PETERS CO., WASHINGTON, D. C.